Aug. 3, 1965

A. D. FURBEE 3,198,944

X-RAY EMISSION ANALYZER WITH STANDARDIZING
SYSTEM AND NOVEL SWITCH MEANS

Filed Nov. 6, 1961

INVENTOR.
AVERY D. FURBEE
BY *Ralph D. Hohenfeldt*
ATTORNEY

INVENTOR.
AVERY D. FURBEE
ATTORNEY

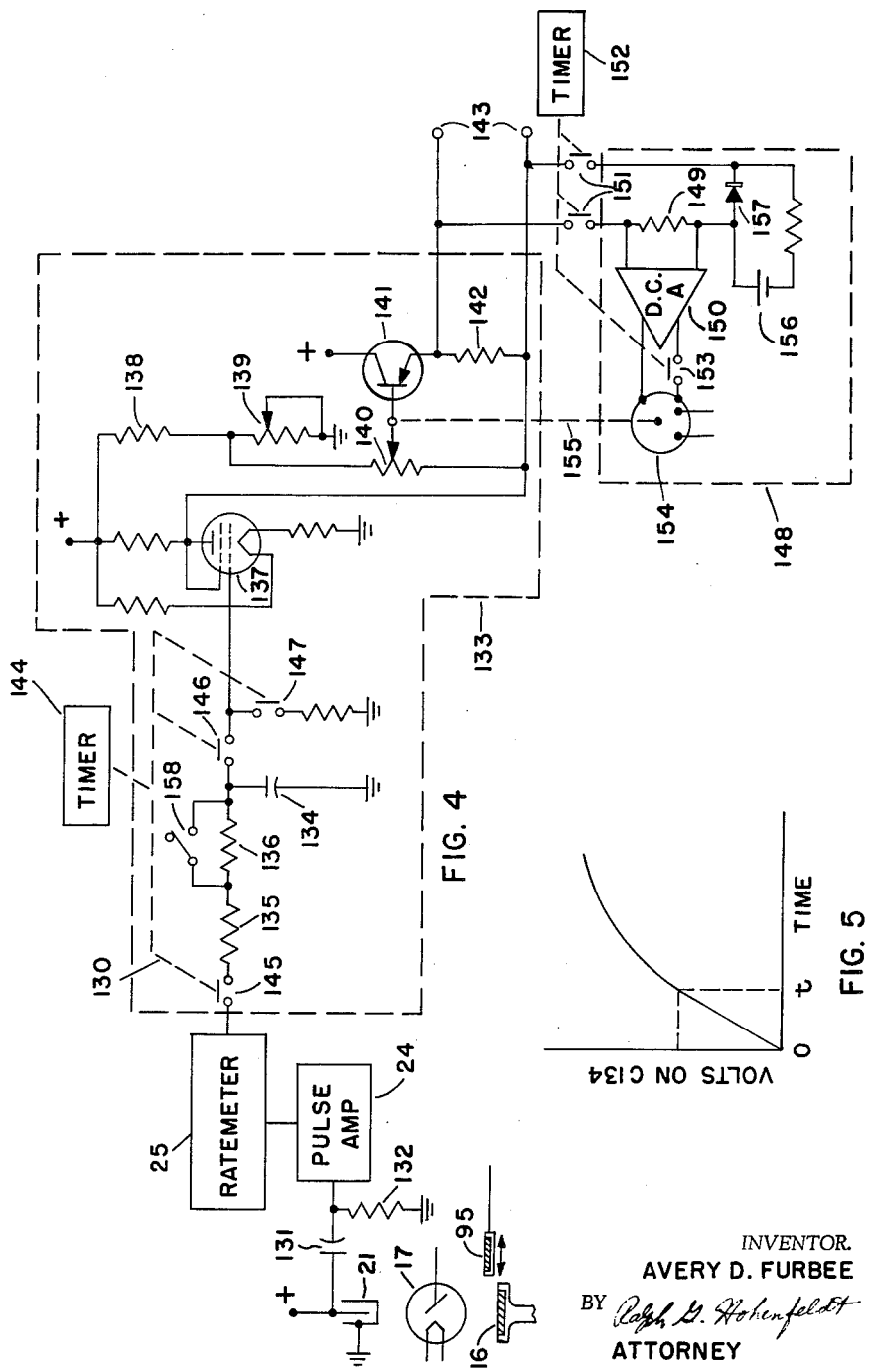

United States Patent Office 3,198,944
Patented Aug. 3, 1965

3,198,944
X-RAY EMISSION ANALYZER WITH STANDARD-
IZING SYSTEM AND NOVEL SWITCH MEANS
Avery D. Furbee, Milwaukee, Wis., assignor to General
Electric Company, a corporation of New York
Filed Nov. 6, 1961, Ser. No. 150,387
1 Claim. (Cl. 250—51.5)

This invention relates to a continuous reading X-ray emission analyzer, and in particular, to a standardizer for maintaining the accuracy of each of its output channels within prescribed limits. For brevity, the analyzer will be called a gage hereinafter.

In X-ray emission spectroscopy a beam of primary X-rays is projected onto a sample whose elemental composition is to be determined quantitatively, qualitatively or both. If the primary beam is sufficiently energetic it excites the elements in the sample to emit radiation whose wavelength is characteristic of the element and whose intensity is indicative of its quantity. An X-ray diffracting crystal may be set in the emitted X-ray field for each element of interest, and when at the proper Bragg angle with respect to a detector, the latter produce individual electric output signals related to the incoming X-radiation. The output signals are usually pulses that are amplified, converted and read out as voltage analogs of the percentage of each element present in the sample. A number of elements in a sample may be measured simultaneously.

An example where a multichannel emission gage has been applied is in the Portland cement industry where it is desired to control quality by continuous "on-line" analyzing a cement mixture for its elemental composition. Here, more or less of an ingredient is inserted when the gage indicates a deficiency or excess of the element in the ingredient. For instance, a cement gage may have channels for measuring the elemental quantity of iron, sulphur, silicon, aluminum and calcium, whereas ingredients composing the mix are ordinarily oxides of these elements. The gage is also useful for analyzing other dry and wet mixtures, on a continuous basis, such as fertilizer, iron ore sinter, rocket fuel and the like.

Because X-ray emission spectra intensities and the proportionate output signals do not yield absolute values for the quantity of the element present in a sample under analysis, it is necessary to calibrate the gage by inserting samples of known composition under the X-ray beam. Usually the samples have been accurately chemically analyzed and the output voltages derived during calibration are plotted against percentage composition variations for the different elements in a number of different samples. In other words, the output voltages from each element measuring channel are coordinated with percentage composition of the element.

There are several factors which affect the accuracy of each element measuring channel during extended operation of on-line X-ray gages. Prominent among these is drift in the various electronic components including the X-ray source and detectors, and the other components intervening between the latter and whatever output indicating or utilizing device is employed. Though the most stable electronic components known are used, there may still be slow changes in each of them over a period of time. These changes may introduce compensating or cumulative errors so that it has been unsuccessful to employ the prior art method of making corrections at points in the system where they are seemingly necessary. The significance of these errors can be appreciated when one considers that the accuracy expected from the gage may be in tenths of a percent of an element which may be only a few percent of the whole sample.

The word accuracy as used herein means the agreement between the true percentage composition of an element in the sample and the corresponding output signal from the gage. The novel apparatus for realizing desired accuracy will hereafter be referred to as an automatic or manual standardizer, or simply, a standardizer. Although the standardizer will be particularly described in conjunction with a couple of exemplary emission gage embodiments, its applicability to comparable X-ray emission analyzers will be readily appreciated by those versed in the art.

A general object of this invention is to provide an X-ray emission gage of improved accuracy.

More specific objects are: to provide a manually or automatically controlled standardizing or re-calibrating device in an X-ray emission gage; to provide a standardizer that is applicable to gages employing diverse electronic systems; to effectuate standardizing a gage periodically with minimum disruption of its regular gaging function; to effect standardizing near the point of gage output in order to correct for any error introducing cause wherever it may occur in the system; and, to impart confidence in controlling on-line processes even though intervention by an operator and the technical competence required of him is minimized. Achievement of these and other objects will be apparent throughout the course of the ensuing specification.

The invention is characterized by temporarily discontinuing regular gage operation and interposing a standard known specimen in the beam from the X-ray tube, deriving a pulse output signal for a preset time from a detector responding to intensity of radiation quanta emitted by each element in the standard specimen, converting the pulsed signals from each channel to a voltage analog of the quantity of each element present, electrically comparing this voltage with a standard voltage or memory representative of what the output voltage should be, and then introducing a suitable correction in the system, if any is needed. After termination of the standardizing interval, all channels of the gage are quickly restored to operation at near whatever output level prevailed in each of them before standardization began.

Illustrative embodiments of the invention will now be explained in conjunction with the following drawings in which:

FIG. 3 is a graph showing the relationship between gage output to ratemeter output, incidental to standardizing;

FIG. 4 shows an alternative form of gage and a modified standardizer; and,

FIG. 5 is a graph of the integration interval employed in the arrangement of FIG. 4.

Figure 1:
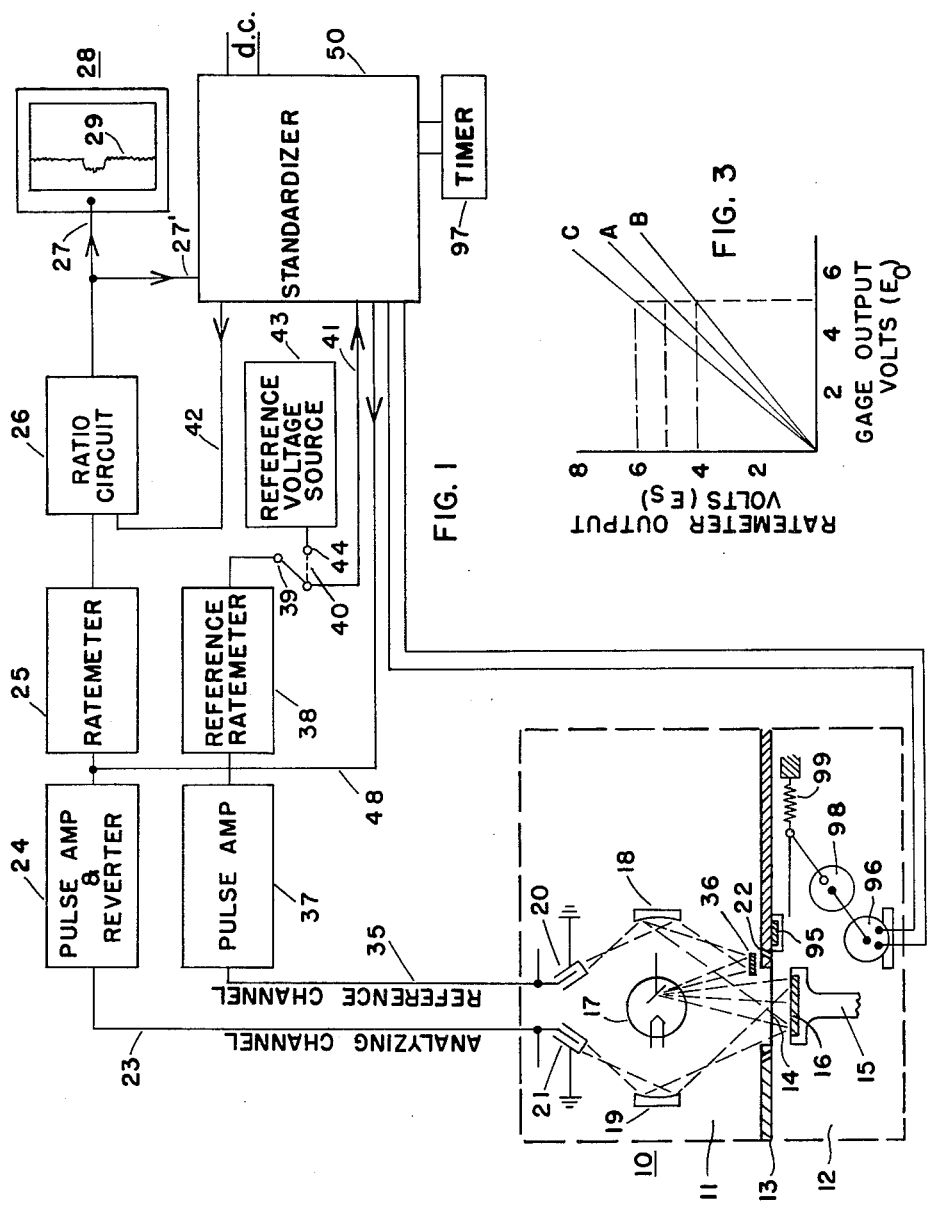
FIG. 1 is a block diagram of a typical multichannel X-ray emission gage system including one form of standardizer in accordance with the invention.

The salient features of one X-ray emission gage using the invention will be outlined primarily in reference to FIG. 1. Here there is a gage head 10 which may be operated under evacuated or gas filled conditions. The head may be divided into two compartments the upper of which 11 contains the X-ray optical elements and the lower of which 12 is devoted to sample presentation. The compartments are separated symbolically by a plate 13 having an aperture 14 closed by an X-ray transmissive window of beryllium, "Mylar" or the like. Immediately beneath the window 14 there is a presenter wheel 15, shown partly broken away, on whose periphery there is a groove for containing some of the sample 16 to be analyzed.

In the upper compartment 11 there is an X-ray tube 17 located for projecting a beam of radiation through window 14 and onto the sample 16 for exciting it to emit its characteristic radiation. Emitted radiation, including various wavelengths characteristic of the elements in the sample, is returned through the window into compartment 11 where it is intercepted by diffracting crystal 19 which directs primarily monochromatic radiation to countertube 21. The source of direct voltage for the countertube is omitted because it is conventional.

On some occasions, where low atomic numbers elements having low energy characteristic radiation are being analyzed, it is desirable to fill compartment 11 with a light gas such as helium in order to minimize attenuation of the characteristic rays. A significant feature of head 10 is that the discharge for the light gas occurs through holes 22 in plate 13 so that the outgoing gas flows over sample 16, thereby purging air from the space between it and window 14. This results in economical use of expensive helium, for instance, and solves the problem of not being able to locate the continuously moving sample directly in gas fill compartment 11 in order to reduce attenuation.

Means for depositing, compressing and smoothly scraping the powdered, dry sample 16 on the wheel are not shown but any suitable means for presenting the sample may also be used. For instance, where a wet slurry is being analyzed the sample may be passed through a pipe that is provided with an X-ray pervious window, or mechanisms for presenting a pelletized portion of the sample may be employed.

As illustrated in FIG. 1, the gage is provided with a reference channel 35 and one analyzing channel 23, although it will be understood that there may be as many analyzing channels as there are elements of interest and there may be more reference channels. In such a case it is only necessary to deploy additional analyzing crystals such as 19 and detectors 21 in suitable positions around the X-ray tube.

In the analyzing channel 23 it is typical for the counter 21 to develop electric pulses whose heights are proportional to the energy of the incoming X-ray quanta and whose rate or frequency is dependent upon the intensity thereof. In this case, the pulses are conducted to a pulse amplifier and reverter 24 which is shown in combination. The reverter is in the nature of a discriminator which passes pulses of a desired magnitude while rejecting others that may be due to X-ray background and the like. Pulses passing from amplifier 24 occur at a random rate and in a predetermined range of heights. These are passed to a ratemeter 25 which is merely symbolized but which contains a monostable oscillator that is triggered by incoming pulses to produce a train of output pulses having a corresponding rate but of a uniform height. As will be explained in greater detail in connection with FIG. 2, the pulses of uniform height are integrated in the ratemeter in an RC circuit for developing an analog voltage whose magnitude depends upon incoming pulse rate. It will also be explained more fully later that the ratemeter in FIG. 1 is a non-linear integrating or RC filter type. That is, it is governed by the exponential nature of the RC curve so that it integrates the average value of incoming pulses.

The analog voltage output from ratemeter 25 is conducted to a ratio circuit device that is symbolized by the block 26. The purpose of the ratio circuit will be more fully discussed later, but for present purposes it is sufficient to say that the voltage on the output line 27 from ratio circuit 26 is proportional or equal to its input voltage from the ratemeter 25. The output signal may be fed to a chart recorder such as 28, or any indicating device on which the output current or voltage may be read. Where other analyzing channels are employed, as is usually the case, their outputs would also be fed into recorder 28 and lines like 29 corresponding with each of them would be scribed on the chart. The distance of the lines from the left boundary of the chart paper may serve as an indication of the quantity of an element present after the instrument is properly calibrated. Information derived from each analyzing channel may also be fed into data processing equipment, not shown, which may operate valves or other devices for controlling input of ingredients being processed and analyzed.

In some gages it is desirable to continuously correct or modify the signal output of the analyzing channel by a signal derived from a reference channel such as 35. For instance, one might want to monitor the output from X-ray tube 17 in which case there is placed in its beam a metal specimen 36, the intensity of whose emitted or scattered radiation fluctuates with X-ray tube output. Radiation from 36 is monochromatized by an analyzing crystal 18 and detected by a countertube 20 to produce a spectrum of pulses that may be amplified in 37 and conducted to a ratemeter 38 whose output voltage is again proporotional to the rate of incoming pulses and independent of their magnitude. The reference signal appearing at the contact 39 of a single pole, double throw switch 40 may be fed on line 41 through the standardizer 50, during normal gage operation, and to the ratio circuit 26 where the correction is introduced in a manner to be described in greater detail later.

Instead of monitoring or referencing the output of analyzing channel 23 to a reference signal derived from radiation emitted by specimen 36, it is desirable on some occasions to take a ratio between the output of the analyzing channel and a fixed voltage from a source 43. By switching 40 so as to connect with contact 44, the first reference channel may be opened and the fixed voltage source fed through cable 41 to the standardizer 50 and then to the ratio circuit 26 via cable 42. Of course, a ratio taken between the output signal of each analyzing channel and a fixed reference voltage preserves the same relationship between the signals in the various analyzing channels as if a straight intensity measurement were made for each element in the sample. As will appear subsequently, the use of a fixed voltage reference 43 facilitates standardizing when reference channel 35 is not used.

Attention is now invited to FIG. 2 in connection with which some circuit details of ratemeter 25, ratio circuit 26 and standardizer 50 will now be described together with an explanation of how the standardizer coacts with the other circuit elements.

Figure 2:
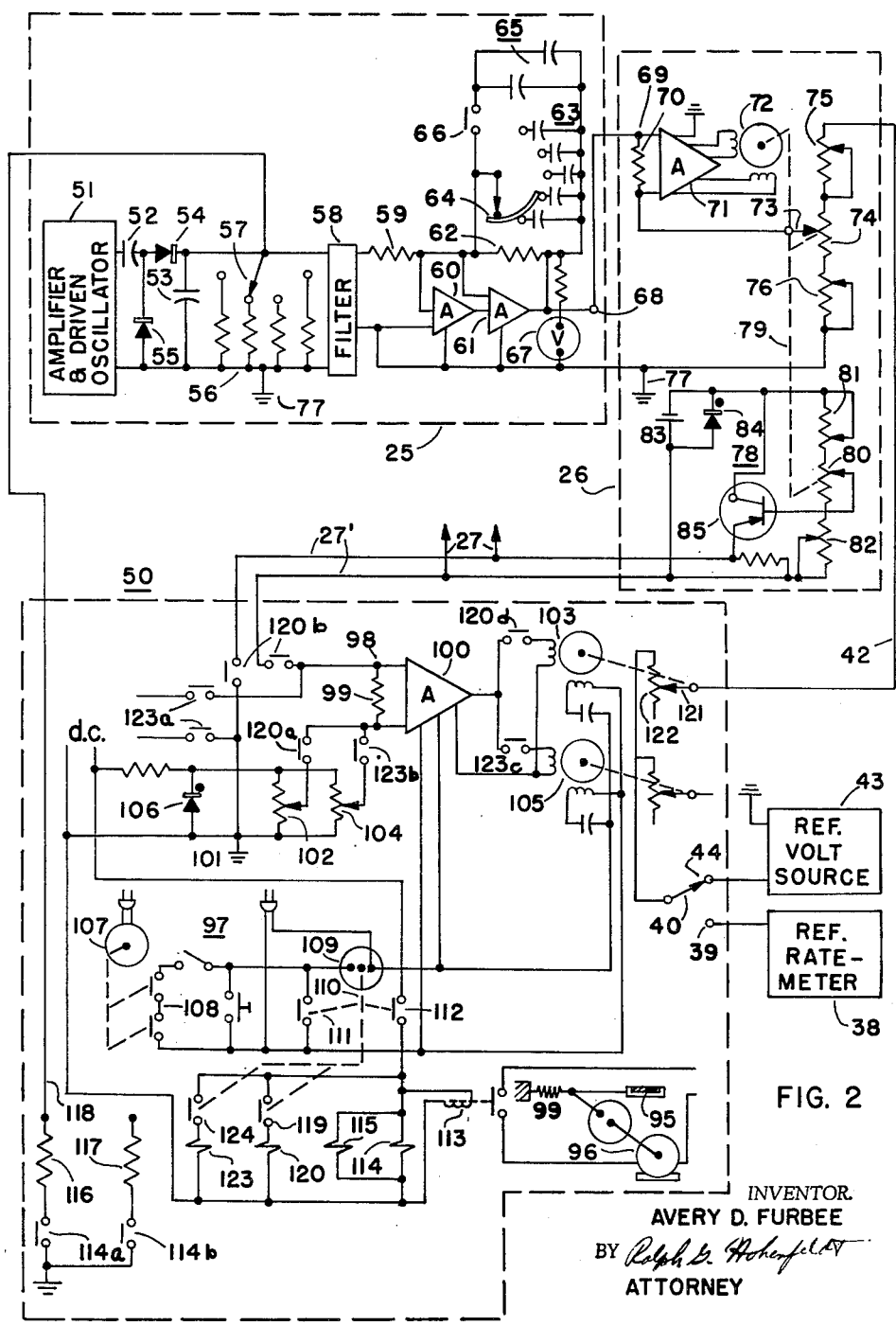
FIG. 2 is a diagram showing certain components of FIG. 1 in greater detail.

The non-linear integrating ratemeter 25 is shown as an entity in FIG. 1 but in FIG. 2 it is shown as being subdivided and contained in the dashed rectangle identified by the reference numeral 25. As explained earlier, the ratemeter includes a driven oscillator 51 that emits output pulses of uniform height but at a rate dependent upon X-ray intensity in the channel. The uniform amplitude pulses are fed into a diod pump circuit, which is of the RC variety, and includes capacitors 52 and 53, diodes 54 and 55, and a group of resistors 56, one of which is selectable through a multi-position switch 57.

The diode pump is adapted to convert constant amplitude random pulses to a continuous read-out voltage that is proportional to the pulse repetition rate. It functions as follows: In the presence of a pulse, capacitors 52 and 53 in series charge on the positive portion of the pulse through diode 54, and during the interval between two consecutive pulses, diode 55 conducts and discharges capacitor 52. For capacitor 53 to have an average voltage on it corresponding with the rate of incoming pulses, it must discharge through a resistor in group 56 between incoming pulses. In the group of resistors collectively designated by the reference numeral 56, one resistor is connected in parallel with capacitor 53 through selector switch 57. The time constant, and hence the voltage on capacitor 53 is dependent on the value of the resistor chosen. The selector switch positions may be labeled in counts per second so that the output voltage can be controlled within predetermined limits consistent with the expected counting rate in that channel. In a commercial device, a full scale final output of ten volts is obtained for pulse rates from 100 to 10,000 counts per second by proper positioning of switch 57. Each resistor in group 56 is different and a low number of counts require high resistance, while a high count rate requires a low resistance in order to hold capacitor 53 at the desired potential level. The time constant of a resistor 56 and capacitor 53 is very short, in the vicinity of five microseconds in a commercial device.

In FIG. 2 the D.C. voltage output from the diode pump is filtered in 58 and passed through resistor 59 to a chopper stabilized operational amplifier 60, 61. The operational amplifier is stabilized by a feedback resistor 62. Thus, the gain of the operational amplifier becomes a function of resistors 59 and 62. The output point of the operational amplifier and, accordingly, the ratemeter 25 is marked 68.

Observe that operational amplifier 61 is associated with a group of capacitors 63 for controlling its time constant which, in reality, means the time required for the ratemeter to reach a steady output condition when a change or statistical variation occurs in the channel input. Sensitivity to minor short term changes is manifested by jiggle of the lines 29 scribed on the chart recorder 28. The capacitors in group 63 may be paralleled with each other to change the ratemeter sensitivity time constant by moving the short circuiting segment of a switch 64.

An additional group of high quality capacitors 65 are also connected in parallel with group 63 by a normally closed relay contact 66. Paralleling all capacitors in groups 63 and 65 results in a time constant, in a practical case, that may be varied between one second and ten minutes or more, if desired. This is the time it takes the ratemeter to register a reading equal to 64% of the final voltage readout whenever a change in input signal occurs. Because of the long time constant that is required for the ratemeter to reach a steady state output after an input change occurs, capacitors 65 are preferably disconnected by opening contact 66 during the standardizing procedure, yet to be described, in which case it is sometimes desirable to reduce the time constant to shorten standardizing time, since high counting rates are usually possible with a standard specimen. After standardizing is completed, capacitors 65 may be re-connected, if they are used, and the time constant will be quickly restored to normal because these capacitors are of such high quality as to hold the charge which they had during normal gage operation prior to beginning of the standardizing interval.

The ratemeter is provided with a voltmeter 67 for quick inspection of the channel output and as an aid in making certain adjustments during installation of the gage.

Attention is invited to FIG. 2 in connection with which ratio device 26 and then standardizer 50 will be described. The ratio circuit has two inputs, one coming from the ratemeter output terminal 68 and another being conductor 42 that is used to admit a reference voltage from source 43 or reference ratemeter 38 during normal gage operation and over which a correction voltage is transmitted during standardization. The input voltages from conductor 42 and the rate meter terminal 68 are continuously compared at a point 69 on a resistor 70 that is connected across a servo amplifier 71. Servo amplifier 71 is of the null balance type and drives a servo motor 72 which positions the arm 73 on a potentiometer 74 to attain balance.

The potential at ratemeter terminal 68 or the top of resistor 70 may vary with respect to ground between zero and ten volts, as an example, depending upon the X-ray intensity in the analyzing channel. The reference voltage is introduced over conductor 42 in a series circuit, in the ratio device 26, consisting of an internal range resistor 75, a balancing potentiometer 74 and an expansion potentiometer 76 terminating at ground point 77.

Servo motor 72 is mechanically connected, as indicated by the dashed line 79, to a balancing potentiometer 80 in a proportional circuit generally designated 78. Resistor 70 across servo amplifier 71 develops a potential dependent upon the ratemeter input voltage. This potential is compared with a potential developed at some point on balancing potentiometer 74 with respect to ground. The latter, of course, has a voltage dependent upon the reference voltage value. When the voltage at contact 73 of potentiometer 74 equals that at terminal 69, the amplifier 71 is nulled and motor 72 is quiescent. If the ratemeter input voltage at terminal 69 changes the amplifier has an input voltage that causes it to drive potentiometer 73 until balance is reached again, whereupon the motor 72 stops.

Potentiometer 80 in proportional circuit 78 corresponds in position with balancing potentiometer 74 as they are mechanically connected by 79. Potentiometer 80, full scale adjusting resistor 81, and zero adjusting resistor 82 are in series with each other and are connected across a direct current supply 83 which is shown as a battery. The voltage across the battery 83, or equivalent D.C. source terminals, may be 12 volts held very stable by a zener diode 84. The voltage on D.C. source 83 and the contact arm on potentiometer 80 is applied to an output impedance matching junction transistor 85. The proportional circuit output potential then appears across conductors 27 which may go to a recorder 28 as in FIG. 1.

It is evident then that the potential on output leads 27 from ratio detector 26 is an analog of the ratio between the ratemeter 25 output voltage and the reference voltage applied from either the electric reference source 43 or a reference ratemeter 38.

During regular operation, the quantity of the elements of interest are read directly from recorder 28. However, it is desirable to check the gage output against a standard specimen whose analysis is known very precisely, at regular intervals, at the end of each eight-hour work shift for instance, and to correct each channel if there is any deviation from its original accuracy. This is done with the standardizer 50.

Standardizer 50 accurately positions a standard specimen 95 under the primary X-ray beam where it should produce the same gage output at all times. If the gage output from any channel is different from that for which it was originally calibrated with the standard specimen, a suitable correction is made. The correct output is obtained, as in FIG. 3, by effectively changing the slope of gage output voltage $E_o$ versus input signal $E_s$ from the ratemeter. The standard sample is a stable, uniform quantity of materials expected in the unknown sample, which is sometimes made to produce a high counting rate in each channel in order to reduce statistical errors and thus produce short standardization time. The standard specimen may be a pellet like 95 or in some cases it may be a powder that is deposited on wheel 15 in place of sample 16 or it may be a liquid or slurry held in an appropriate container that may be inserted in the primary X-ray beam.

Standardization is accomplished on the assumption that errors produced in the gage in any stage are of the proportionate type. Therefore, the preferred choice of electrical compensation is that which introduces a correction of the same character over the entire calibration range. It is possible, as in the embodiments shown, to design the system so that only proportionate type errors are likely to occur and the validity of the standardizing procedure here chosen is not affected by the fact that compensating or additive errors may occur at different places in the system. This permits use of a single standard specimen for standardizing rather than two specimens as might otherwise be required. In on-line process analyzers it is found that, generally speaking, the range of calibration is quite restricted, that is, the elemental variations in the analyzed substance is small so that even if other small deviations from the proportionate type are encountered, negligible error will be introduced in the standardizing procedure using the proportionate method.

Referring to FIG. 1 it will be seen that standard specimen 95 may be projected into the X-ray beam over unknown samples 16 in response to a driving motor 96 that receives its periodic operating signal from a timer 97 associated with standardizer 50. The mechanism by which motor 96 transports standard specimen 95 into the beam may take any suitable form but is here shown as including an eccentric 98 operating in opposition to a return spring 99.

Referring again to FIG. 2, it will be seen that the output signal from ratio circuit 26 is fed over conductors 27' to standardizer 50 where the potential is applied to a terminal 98 of a sensing resistor 99 that is connected across a null balance amplifier 100 and a ground point 101. A comparison potential is developed across potentiometer 102 which is also applied to resistor 99 while the standard specimen 95 is in the beam. Potentiometer 102 is then adjusted until servo motor 103 stops driving at which time the potentials applied across null amplifier 100 from potentiometer 102 and the analyzing channel over leads 27' are equal. Thus, for one of the elements being analyzed, a preset voltage established across potentiometer 102 serves as a memory for later comparison with the gage output when the standard specimen is again inserted in the beam. This process of measuring and retaining the proper output voltage may be repeated for each analyzing channel by adjusting other potentiometers such as 104 which may control other servo motors such as 105.

Potentiometers 102 and 104 may be fed from a D.C. supply circuit that is held very constant by a zener diode 106 so that the comparison voltages are always the same.

The standardizer 50 is connected to each ratio circuit or other ouput device in sequence, after the gage has operated for a predetermined interval, whereupon a correction is made in the output in each channel if any is necessary. The correction is introduced to the ratio circuit in this case by changing the voltage across balancing potentiometer 74.

The standardizer may be manually or automatically energized at predetermined intervals during which the gage is to be checked for accuracy. For this purpose there is a timer 97 including a motor 107 that may be energized from any suitable power source. At the end of an operating interval for which the timer is set, motor 107 closes its contacts 108 and this causes a sequence controlling motor 109 to be energized. Motor 109 closes a number of contacts in proper order by a cam that is symbolized by the dashed line 110 in FIG. 2. When the sequence motor 109 starts, it closes its holding contact 111 and next a contact 112 that places D.C. on a relay 113 that operates standard specimen presenter motor 96 from an A.C. line. Standard specimen 95 is driven into the primary beam under the influence of motor 96. The same contact 112 energizes a pair of relay coils 114 and 115 which close normally open contacts 114a and 114b, and thereby connect range change resistors 116 and 117 in parallel with the active counting range resistor 56 in a ratemeter 34 in each analyzing channel. The conductor 118 that connects range change resistor 116 in parallel with range resistor 56 may be seen in FIG. 2 to connect between point 57 and the ground point 77 in the ratemeter. It is necessary to change the time constant of the diode pump in this way during standardization because the standard specimen 95 either has more of an element present than is normally found in the sample being analyzed or due to difficulties in making a standard sample of the precise nominal count rate as found in the sample analyzed. The resistors 116, 117 etc. serve as a "trim" of the output signal produced by the standard sample, keeping it in the desired nominal electrical output range.

Relay 115 is used to disconnect the external capacitor bank 65 from the ratemeter output circuit so that any changes made during standardizing may be observed with minimum delay in standardization and to hold the voltage in capacitor bank 65 during the standardization. Capacitor group 65 is open when contact 66 operates in response to energization of relay coil 115.

During the standardizing procedure, sequence motor 109 continues to operate and closes a contact 119 that energizes a relay coil 120. Coil 120 then closes a contact 120a, putting the comparison voltage that appears across a memory potentiometer 102 on amplifier resistor 99. It also closes contacts 120b, putting the ratio circuit output potential on amplifier 100 across resistor 99. At the same time contact 120d, in the output circuit of amplifier 100, closes to complete a circuit through the control windings of servo motor 103 for the channel being standardized. If there is a potential difference at the input to amplifier 100, causing unbalance, indicating that the standard specimen is yielding different values from those for which the gage was calibrated, servo motor 103 drives a contact 121 on an adjustable external range resistor 122 until the standardizer sees the proper voltage from the ratio circuit over leads 27'. Within a minute, when the correction is completed, the standardizer indexes to the next channel. Upon this event, sequence motor 109 deenergizes relay 120 and energizes the next relay 123 through operation of contact 124. This connects a different ratio detector from another channel through input contacts 123a, selects the next proper comparison resistor 104 by closing contact 123b, and the proper servo motor 105 by closing contact 123c. After all channels are standardized, the standard specimen 95 is retracted from the primary X-ray beam, the standardizer is disconnected and the gage continues analyzing the unknown sample 16.

The electrical aspects of correcting a channel will now be examined. First observe that, during standardization, a fixed electrical reference voltage of around 13 volts, for instance, may be supplied to each external range resistor such as 122. This may be from any separate stable source, but for simplicity, it is shown as being supplied from reference voltage source 43 through selector switch 49 in FIG. 2.

Balance potentiometer 74 in the ratio circuit was set at mid-point originally, which means that the output of the ratio circuit is at its mid-point, so that the potential appearing between contact 73 of potentiometer 74 and ground point 77 nulled the potential from the ratemeter on the input of null amplifier 71. As an example, if there are five volts appearing between ratemeter terminal 68 and ground and five volts from potentiometer 74 to ground, the proportional circuit will yield five volts out on lines 27'. The channel would then be operating on curve A of FIG. 3 which is made by allowing signal voltage $E_s$ to vary from zero to ten volts. The mid-point of arm 73 on potentiometer 74 would be established by proper adjustment of the internal range resistor 75. Now assume that the input to ratio circuit input point 69 from the ratemeter terminal 68 has a potential $E_s$ of four volts instead of five as it ought to read with the standard specimen 95 in the X-ray beam. The servo motor 103 of the standardizer will then drive the contact arm 121 of the external range resistor 122 to a new position so that the total potential drop on the balancing potentiometer 74 will be eight volts, or four volts from mid-point to ground. To do this the external range potentiometer 122 must have its resistance increased. Under these conditions the gage channel would operate on a new curve B in FIG. 3 where it can be seen that for four volts $E_s$ into the ratio circuit 63, five volts $E_o$ are properly read out of the proportional circuit on conductors 27'. This is so because protentiometer 80 in the proportional circuit has a constant ten volt drop across it, and when it is centered it has a five volt output.

If the ratemeter signal $E_s$ increases to six volts, for instance, when $E_o$ ought to be five, external range resistor 122 will decrease in value and curve C in FIG. 3 would be traced to give five volts output for a six volt input. In summary, it is seen that the reference voltage, or ratio denominator, is altered to correct for any differences between what the standard specimen signal ought to be as compared with the output of the gage.

Incidentally, ratio circuit 26 is equipped with an expansion potentiometer 76 that can be suitably adjusted so that a fraction, one-half for example, of the ratio detector output will be spread over full scale deflection of the recorder. In this case, continuing with the exemplary voltage values, the signal voltage $E_s$ can vary from five to ten volts to provide an output on a zero to ten volt scale in the recorder 28 or other read-out device. In the proportional circuit, resistors 81 and 82 are adjustable to set the zero and full scale output deflections of the recorder 28.

If the gage is being operated during normal analysis with a voltage from the reference ratemeter 38 connected to the input terminal of the external range potentiometer 122, then of course, the reference channel will remain connected during standardization by letting switch 40 remain in contact with terminal 39. In this case any change that the reference channel may have undergone, as compared with its original output when calibrated with the standard sample 95 in the beam, will also be corrected. This is so because all deviations from normal are corrected through re-positioning a single variable resistor like 122 for each channel.

The above described multi-channel X-ray emission gage in connection with which one form of the new standardizer has been described is one where there is an individual analyzing channel for each element to be measured in the unknown sample and where the pulses from detector 21 are integrated non-linearly in ratemeter 25. The standardizer may also be used in connection with gages whose signals from detectors such as 21 are stored and read out by connecting the ratemeter 25 sequentially to a storage capacitor in each channel. The standardizer can also be used in connection with gages in which each channel output is integrated linearly as will now be described in connection with FIGS. 4 and 5.

In FIG. 4 part of each channel may be similar to that found in the analyzing channel of the previously discussed gage embodiment. That is, we may again have an unknown sample 16 or a standard specimen 95 in the primary X-ray beam from source 17. Characteristic radiation from the element of interest is detected in a countertube 21 and the pulses produced thereby appear on a capacitor 131 where they develop a voltage across a resistor 132 that is amplified in pulse amplifier 24. The amplified pulses may again be used for triggering an oscillator in a ratemeter 25 so that it puts out pulses of uniform height but at a rate corresponding with the incoming pulse rate.

In this case, it is desired to integrate the ratemeter output over a short interval corresponding with the linear portion of an RC curve as between zero and $t$ on the exponential charging curve shown in FIG. 5. In the linear integrator portion of the device set off by a dashed line to which the reference numeral 133 applies, there is provided for this puprose an integrating capacitor 134 and charging resistors 135 and 136. The charge integrated on capacitor 134 is amplified in an electrometer 137 tube which conducts the amplified current through a bridge circuit comprising resistors 138 and 139. The voltage developed between these resistors causes a potential to appear across an adjustable resistor 140 in the base circuit of a transistor 141 connected as an emitter follower. The output voltage, indicative of the rate of incoming X-ray quanta and amount of element present, appears across an emitter resistor 142 and output terminals 143. These output terminals may normally supply a meter or recorder such as 28 in FIG. 1.

In order that integration be performed only for a short period over the linear portion of the RC curve, there is provided a timer 144 that initiates and terminates the integrating interval by controlling appropriate contacts through a mechanism or electric device symbolized by the dashed line 130.

When reading an input signal from ratemeter 25, contact 145 is closed so that the signal passes through resistors 135 and 136 to charge capacitor 134. At time $t$ in FIG. 5, contact 145 opens and contact 146 closes to place the voltage integrated on capacitor 134 on the control grid of electrometer tube 137. Meanwhile contact 147 is open. The voltage on capacitor 134 is then amplified in tube 137 as indicated above and the output analog voltage is read out on terminals 143. After this short interval, the timer causes 147 to close for discharging capacitor 134 after which 147 opens along with 146. Contact 145 then closes and integration of the X-ray intensity from sample 16 is repeated.

In order to calibrate the linear integrator for obtaining the proper output voltage at terminals 143 after extended operation of the gage, the standard specimen 95 is interposed in the beam and the signal read out. At this time the potentiometer 140 in the emitter 141 base circuit is in a particular position.

The standardizer enclosed within dashed line 148 is adapted to compare the desired voltage on output terminals 143 when the standard specimen is in the beam with a voltage appearing on resistor 149 which is across a null amplifier 150. This is achieved through closing a pair of contacts 151 with timer 152 that controls the standardizing interval. Contacts 151 are closed along with a contact 153 that controls a servo motor 154. Servo motor 154 operates at any time there are unbalanced voltages appearing across resistor 149 of amplifier 150. Motor operation causes potentiometer 140 in the transistor base circuit to assume a new position which raises or lowers the voltage on output terminals 143 until balance between the standardizer and linear integrator circuit is achieved. The motor may be connected to potentiometer 140 by mechanism symbolized by the dashed line having the reference numeral 155.

As in the previously described embodiment of the standardizer, a memory of what the output voltage should be with the standard specimen in the beam is retained on a variable resistor 149 that is supplied from a D.C. source shown as a battery 156 which is highly stabilized by a zener diode 157.

At the beginning of a standardizing interval, timer 152 had closed contacts 151 and 152 and at the end thereof these contacts are automatically opened so that the gage may resume normal operation. As in the previous case, only one amplifier such as 150 is necessary to control a number of adjustable potentiometers 140 through a number of individual servo motors 154. Of course, the comparison or memory resistors like 149 must be isolated in order that each can be available for producing a comparison voltage appropriate with the channel for which it is calibrated.

As was stated in connection with describing the first embodiment of the invention, it is often desirable that the integrating interval be shortened during standardizing or at a time when a quick check-out of the gage is desired. In the FIG. 4 embodiment, this feature is made possible by use of a manual or timer operated switch 158 that can be closed to shunt charging resistor 136 and thereby decrease charging time on integrating capacitor 134.

The new method and apparatus for standardizing a continuous readout on-line X-ray gage has been described primarily in connection with one that derives its output signals from an input of characteristic X-rays emitted by the sample being analyzed. Those versed in the art, however, will appreciate that the same principles of standardization may be employed in gages that depend upon X-rays being diffracted or scattered by the sample where the detected intensities of wavelengths of the diffracted or scattered rays serve to indicate a condition of the sample other than its elemental composition. For instance, the X-rays diffracted by crystals in a rapidly moving sheet of steel passing through an annealing furnace may be detected to serve as an indication of the crystal orientation, grain size or degree of anneal of the metal. In such a case, the standard specimen is one that has the properties which are being looked for during the continuous analysis and this specimen would be inserted in the beam periodically to see if the gage output is correct. Again the output voltage is compared with a standard voltage that was established on a first occasion when the standard specimen was in the beam and a correction suited to the type of instrument is made. Accordingly, it is intended that the concept of emission analysis be construed to embrace any device wherein primary X-radiation is modified by a condition of the sample to produce radiation that is detectable and convertible to an electric output signal.

In summary, there have been described different X-ray gages whose outputs can be corrected with the new standardizing procedure on a manual or automatic basis. All place a standard specimen in the beam of the X-ray tube, integrate the X-radiation produced for each element or for each condition for a preset time, and then by means of suitable electronics compare the output signals in each channel of the gage with standard pre-established voltages that serve as a basis for making a correction for any deviation that may have resulted over a prolonged period of gage operation. In each case, standardization and correction is effected near the output stage of each channel so that all inaccuracies that may have occurred in the system at previous stages are corrected for.

Although the invention has been described in such detail as to enable understanding its principles, it is to be understood that such descriptions are illustrative rather than limiting, for the invention may be variously embodied and is to be construed in accordance with the scope of the claim which follows:

It is claimed:

In an X-ray emission analyzer having a source of primary X-rays for exciting chemical elements in a sample of unknown element quantity to emit X-radiation that is characteristic of an element, detector means for the characteristic radiation of one element that develops electric pulses the development rate of which depends upon the quantity of the element present in the sample, means for integrating said pulses to develop a first voltage that is proportional to the quantity of the element, means for accommodating a standard specimen including the same element in said primary rays to the exclusion of said sample, which standard specimen causes a second voltage to be developed by said detector and integrating means on a first occasion, means for establishing and storing a voltage having a predetermined relationship with the second voltage, means for comparing said second voltage only with said same established voltage during a standardizing interval on another occasion, means responsive to the difference between said established voltage and said second voltage on the other occasion for effecting the desired proportionality between the first voltage and the quantity of the element, said integrating means including a resistor and capacitor combination on which capacitor said first voltage normally appears as the output voltage that is indicative of the quantity of the element, and switch means in circuit for disconnecting said capacitor in a precharged condition to retain the first output voltage that was developed with the sample of unknown element quantity in the primary X-rays, said switch means being adapted to reconnect said capacitor in its precharged condition after the standard specimen is removed from the primary X-rays at the end of the standardizing interval.

References Cited by the Examiner
UNITED STATES PATENTS

| | | | |
|---|---|---|---|
| 2,579,825 | 12/51 | Hutchins | 250—43.5 |
| 2,675,734 | 4/54 | Hasler et al. | 250—43.5 |
| 2,792,501 | 5/57 | Barton | 250—43.5 |
| 2,848,624 | 8/58 | Friedman et al. | 250—51.5 |
| 2,874,298 | 2/59 | Kindred | 250—43.5 |
| 2,897,367 | 7/59 | Andermann et al. | 250—51.5 |
| 2,951,161 | 8/60 | Foster et al. | 250.—83.4 |

RALPH G. NILSON, *Primary Examiner.*